April 25, 1961 L. PÉRAS 2,981,534
SHOCK ABSORBERS
Filed March 20, 1959 2 Sheets-Sheet 1
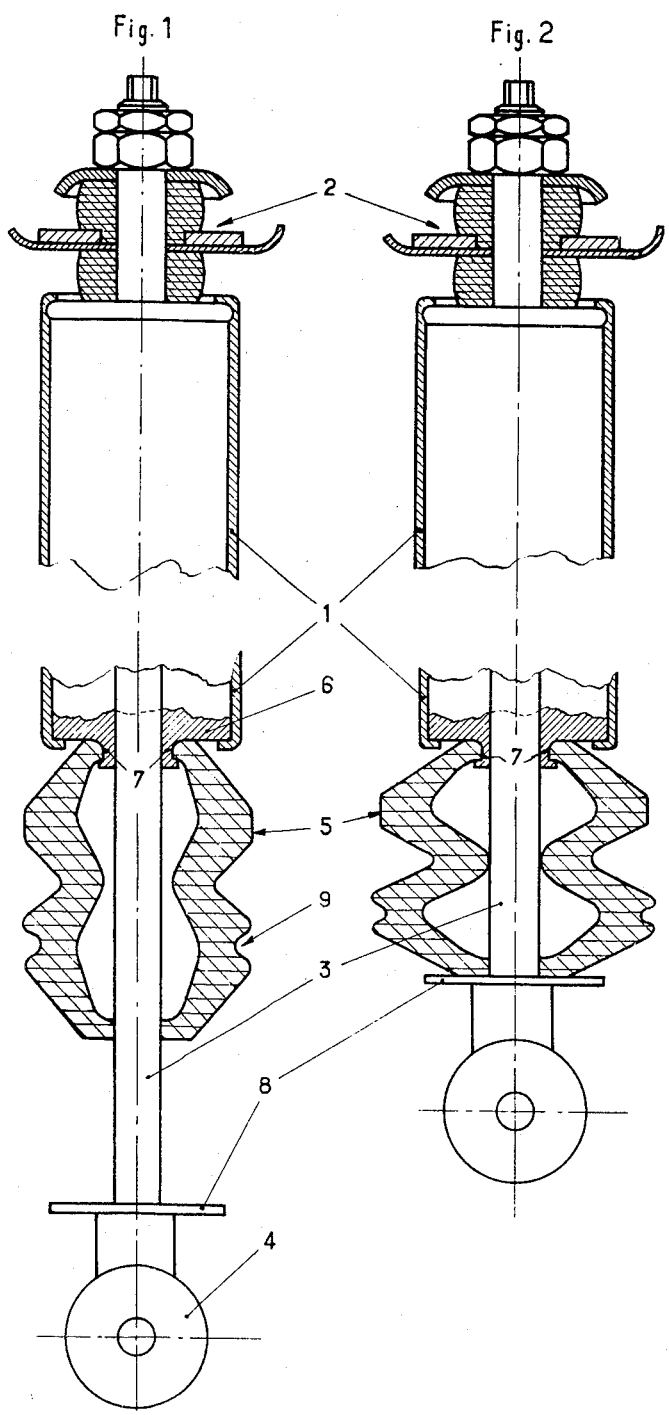

April 25, 1961    L. PÉRAS    2,981,534
SHOCK ABSORBERS
Filed March 20, 1959    2 Sheets-Sheet 2

United States Patent Office 2,981,534
Patented Apr. 25, 1961

2,981,534
SHOCK ABSORBERS
Lucien Péras, Billancourt, France, assignor to Regie Nationale des Usines Renault, Billancourt, France
Filed Mar. 20, 1959, Ser. No. 800,796
Claims priority, application France Jan. 29, 1959
3 Claims. (Cl. 267—8)

The present invention relates in general to shock absorbers and has specific reference to shock absorbers of suspension systems of automobiles.

The improved shock absorber forming the subject-matter of this invention is characterized notably by the combination of a telescopic shock absorber with a resilient block or cushion, and also by the use of blocks of this character as auxiliary resilient suspension members.

More particularly, this invention is concerned with a parallel arrangement of a telescopic shock-absorber— which may be of any known or suitable type—with a resilient block or cushion of the type constituting a resilient thick-walled bellows which may also be of a type already known per se.

In the aforesaid parallel arrangement and in the specific case of an automobile suspension system the resilient block or cushion constitutes an auxiliary suspension spring, the use of a cushion of this character imparting a most desirable and advantageous variable-flexibility characteristic to the suspension system.

According to a specific feature of the present invention, the combination of the aforesaid resilient cushion with the telescopic shock absorber is obtained by threading the cushion on the piston rod of the shock absorber.

This cushion may advantageously be secured to the bottom of the relevant shock absorber cylinder by causing the upper end of the cushion to be clamped in a groove provided to this end in said bottom, the piston rod being provided in this case with an end plate or disc solid therewith and adapted to be engaged like an abutment by the lower or opposite end of the cushion when the latter is subjected to compressive stress.

A combination according to the arrangement broadly described hereinabove is characterized notably by the following advantageous features: economical cushion assembly; reliable protection of cushion against wear and tear as it is perfectly guided on the piston rod; reduction in over-all dimensions; as the cushion protects the piston rod of the shock absorber the usual protector may be either dispensed with or reduced in size and therefore in cost.

In order to afford a clearer understanding of this invention and of the manner in which the same may be carried out in the practice, reference will now be made to the accompanying drawings forming part of this specification and illustrating diagrammatically by way of example a typical form of embodiment of the invention.

Figure 3:
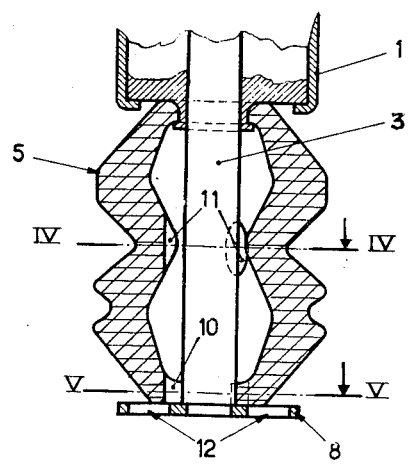
Figure 4:
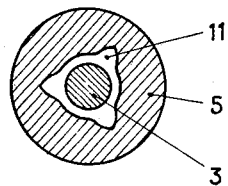
Figure 5:
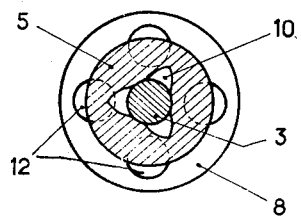

In the drawings:
Figure 1 is an axial longitudinal section showing the mounting of a shock absorber device in its extended position;
Figure 2 is a view similar to Fig. 1 but showing the shock absorber device in its compressed condition;
Figure 3 is a fragmentary cross-sectional view showing a modified detail of the cushion structure, and
Figures 4 and 5 are cross-sectional detail views taken upon the lines IV—IV and V—V of Fig. 3.

Referring first to Figs. 1 and 2 of the drawings, the telescopic shock absorber forming part of the device of the present invention is shown as comprising a body or cylinder 1 secured at one end by means such as 2 to the body of a vehicle, the piston rod 3 of this shock absorber carrying on its outer end an eyelet 4 adapted to be connected to a wheel supporting arm (not shown).

According to this invention, a resilient cushion 5 is fitted on the piston rod 3 of the shock absorber so as to operate in parallel therewith and to be responsive to compressive stress between the bottom 6 of the shock absorber and the outer end of the piston rod.

The cushion 5 constitutes in the known manner a kind of thick-walled bellows of resilient material.

Preferably, this cushion is attached to the shock-absorber bottom 6 by having its upper end resiliently clamped in a groove 7 formed in this example on a lower extension of the bottom 6. The piston rod 3 is provided on the other hand with a plate or disc 8 secured on its lower end and permitting the proper compression of the cushion 5, as shown in Fig. 2.

According to the arrangement illustrated in the drawings, the cushion 5 ensures an already adequate protection of the piston rod 3, notably the portion thereof which projects from the shock absorber body. However, if desired, the piston rod portion projecting from the resilient cushion 5 during the operation of the shock absorber may be protected by providing a conventional-type flexible bellows protector (not shown) of reduced dimensions, fitting at one end in a groove 9 formed in the lower swelling of the cushion.

As the cushion illustrated by way of example in the drawings is formed with two swellings, it is apparent from Fig. 2 that the cushion is properly guided during its compression due to the fitting of its two ends and also of its intermediate inner swelling on the rod 3, as shown.

With this mounting it is also possible to provide adequate venting means for the controlled release of the air trapped in the cushion during the compression thereof.

As illustrated in Figs. 3 to 5 of the drawings, axial grooves are formed on the one hand at 10 in the cushion end adjacent to the rod end and on the other hand at 11 in the inner intermediate swelling of the cushion. Moreover, the abutment-forming plate or disc 8 is perforated at 12 to permit a certain overlapping with the end grooves 10 of the cushion.

As illustrated in Fig. 5, three radial grooves 10 spaced 120 degrees apart are provided in the cushion end, and four holes 12 spaced 90 degrees apart are formed in the plate or disc 8, so as to ensure a certain overlapping between the cushion material and the holes 12 irrespective of the relative angular positions of the cushion and plate; if desired, this overlapping may be variable or fixed as a function of the relative angular position of the cushion and plate assembly.

Although a specific form of embodiment of the present invention has been described hereinabove and illustrated in the accompanying drawings, it will be readily understood by anybody conversant with the art that various details and relative dimensions may be altered therein without departing from the basic principles of the invention as set forth in the appended claims.

I claim:
1. A shock absorber comprising, in combination, a telescopic shock absorber having a cylinder and a piston rod mounted therein to allow relative axial movement between it and the cylinder, the rod extending axially outwardly at one end of the cylinder an elastic auxiliary spring element connected at the end of the cylinder through which said piston rod extends comprising, a thick walled bellows of resilient material having one end free, the piston rod extending axially through said bellows, abutment means fixed on the rod spaced axially apart from the end of the cylinder to which the bellows is fixed and outwardly of the bellows whereby the bellows is compressible between the abutment means, and said end of the cylinder, said bellows having at least one opening at the free end thereof radially of the piston rod, and said abutment means having at least one opening with which at least a part of the opening of the bellows is in registry.

2. A shock absorber comprising, in combination, a telescopic shock absorber having a cylinder and a piston rod mounted therein to allow relative axial movement between it and the cylinder, the rod extending axially outwardly at one end of the cylinder, an end closure member at said one end of the cylinder, said end closure member having an axial opening through which said piston rod extends outwardly of said cylinder, said end closure member having on an outer face thereof an annular groove around said opening, an elastic auxiliary spring element comprising a thick walled bellows of resilient material through which the piston rod extends axially, said bellows having a radially stretched marginal end portion housed in said annular groove holding said bellows fixed to said end closure member and having an opposite end free, and abutment means fixed on the rod spaced axially apart from the end closure member to which the bellows is fixed and disposed axially outwardly of the bellows, whereby the bellows is compressible between the abutment means and said end closure member of the cylinder.

3. A shock absorber comprising, in combination, a telescopic shock absorber having a cylinder and a piston rod mounted therein to allow relative axial movement between it and the cylinder, the rod extending axially outwardly at one end of the cylinder, an end closure member at said one end of the cylinder, said end closure member having an axial opening through which said piston rod extends outwardly of said cylinder, said end closure member having on an outer face thereof an annular groove around said opening, an elastic auxiliary spring element comprising a thick walled bellows of resilient material through which the piston rod extends axially, said bellows having a radially stretched marginal end portion housed in said annular groove holding said bellows fixed to said end closure member and having an opposite end free, abutment means fixed on the rod spaced axially apart from the end closure member to which the bellows is fixed and disposed axially outwardly of the bellows whereby the bellows is compressible between the abutment means and said end closure member of the cylinder, said bellows having at least one opening at the free end thereof radially of the piston rod, and said abutment means having at least one opening with which at least a part of the opening of the bellows is in registry.

References Cited in the file of this patent

UNITED STATES PATENTS

| 168,845 | Pratt | Oct. 19, 1875 |
| 2,441,629 | Hahn | May 18, 1948 |
| 2,833,535 | Blythe | May 6, 1958 |

FOREIGN PATENTS

| 650,195 | Germany | Sept. 13, 1937 |
| 487,319 | Italy | Nov. 30, 1953 |